H. KOPPERS.
RETORT OVEN FOR PRODUCING GAS AND COKE.
APPLICATION FILED FEB. 17, 1911.
1,026,169.
Patented May 14, 1912.
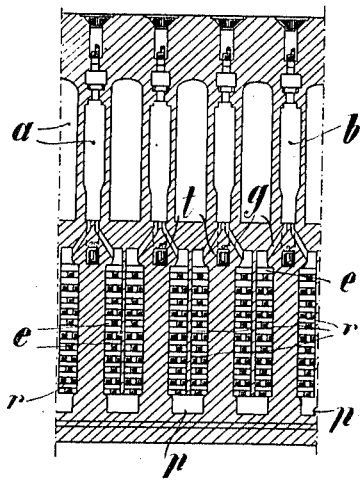
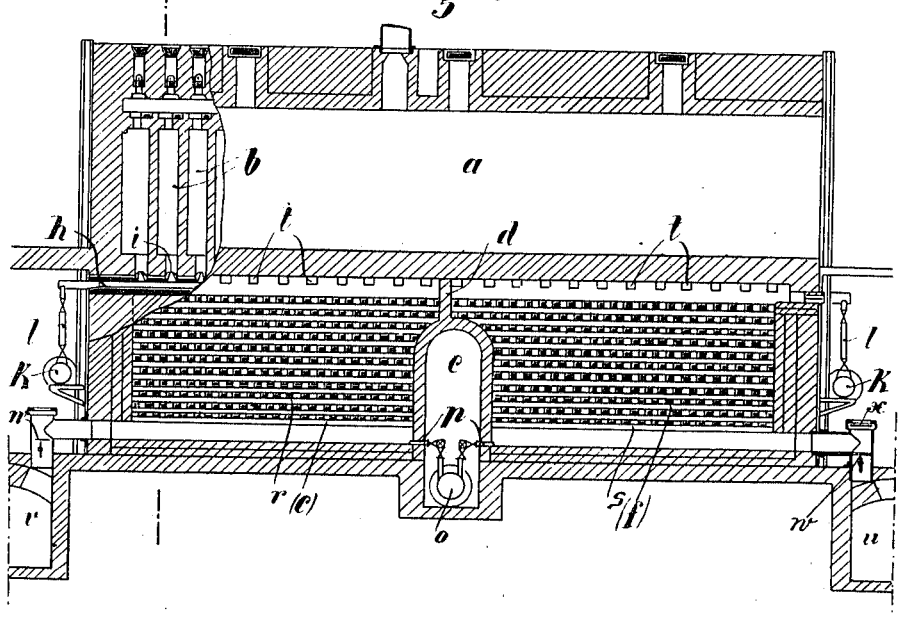

UNITED STATES PATENT OFFICE.

HEINRICH KOPPERS, OF ESSEN-RUHR, GERMANY.

RETORT-OVEN FOR PRODUCING GAS AND COKE.

1,026,169.  Specification of Letters Patent.  Patented May 14, 1912.

Application filed February 17, 1911. Serial No. 609,261.

*To all whom it may concern:*

Be it known that I, HEINRICH KOPPERS, a citizen of the German Empire, and resident of 30 Isenbergstrasse, Essen-Ruhr, Germany, have invented new and useful Improvements in Retort-Ovens for Producing Gas and Coke, of which the following is a specification.

In the working of large chambered ovens or retorts for producing gas and coke, that is to say of retorts which have in the main been evolved from the modern coke oven, the fluctuations of the market and industrial conditions make it desirable that the plant should be capable of being used alternatively as a gas retort and as a coke oven. Inasmuch as ovens with regenerators are mainly in question, the alternative use involves different conditions in regard to the preliminary heating of the heating gases, according to whether part of the distillation gas itself, or special generator gas, is to be used for heating the oven. In the one case it is not practicable to preliminarily heat the distillation gases owing to the ready decomposition of the same, while with the generator gas of inferior value it is not only possible but necessary to pre-heat.

The present invention provides a simple solution of the problem involved by the change in the working, and is characterized by the heating walls of the chambers, i. e. the several heating flues, being provided with means for direct admittance of gas from a special channel and also with means connecting each to two regenerators. For one of the two alternative modes of operation, the regenerators are used solely for preliminary heating of the air for combustion, while the gas channel conducts the excess of gas from the ovens and in some cases hot generator gas as well. For the second mode of operation, with working i. e. preliminary heating of generator gas admitted cold, the special gas channel is disconnected, and one of the regenerators connected with each heating wall or flue is used as an air heater and the other as a gas heater. A type of oven well suited for this arrangement is that described in my prior specification of Letters Patent No. 818033, of April 17, 1906 in which the regenerators are arranged beneath the battery of ovens, directly parallel with the heating walls. The construction of the regenerators themselves is substantially the same in Figure 3 of said prior specification, the heating walls being alternately connected to the gas and air heaters on the right and left.

The present invention is illustrated in the accompanying drawings wherein:—

Fig. 1 is a cross section of a battery of ovens, and Fig. 2 a longitudinal section of one of the heating walls and chambers.

The heating walls *b* arranged between the coking chambers *a* are connected by the passages *g* with the regenerators *e* and *f*, which are arranged in series in the path of the gas currents and are separated by the arch *c* and wall *d*; the heating walls also communicate by passages *t* with the similarly arranged regenerators *r* and *s*. Each heating flue *b* also communicates by a nozzle *i* with a gas distributing passage *h* formed in the brick-work, said distributing passage being connected by a pipe *l* to one of the gas mains *k*. The regenerators *r* and *s* are connected by pipes *p* with the separate gas conduits *o*. The regenerators *s* and *f* are connected to the discharge conduits *u* by conduits controlled by valves *w* and the regenerators *e* and *r* are similarly connected to the discharge conduits *v*. All the regenerators also have closable connections *x* communicating with the atmosphere or with passages running along the battery.

The manner of using the apparatus is as follows:—If the excess of gas, which is of a nature not enabling it to be heated, is to be used for heating the oven, the conduit *o* is completely closed and the regenerators of one half of the oven are alternately connected with the discharge conduits *u* and *v* by opening the valves *w* and closing the valves *x*; the regenerators on the other side are connected to the atmosphere by closing the valves *w* and opening the valves *x*. On the same side heating gas is admitted from the gas main *k* to the passages *h*, and is burned in the flues *b* of one half of the oven, and descends the heating flues of the other half, whence it passes through the regenerators arranged parallel with the said heating flues, into the discharge conduit. The draft may be reversed in about half an hour by means of the usual reversal of the valves.

If the working is to be conducted with preheating of both combustion agents, the supply of gas through pipes *l* is cut off, and the valves *x* are closed to disconnect the regenerators *r* and *s* from the atmosphere.

While the regenerators e and f are worked as above described, the regenerators r and s are used for pre-heating the gases admitted through the conduits o, by alternate connection to the said conduits o. In this case also the draft is reversed after the usual period of about half an hour, so that a normal recovery of heat with preliminary heating of gas and air is attained.

In erecting a plant primarily for one of the two operations referred to, it may yet be desirable to adopt the arrangement according to the present invention, with a view to future developments, but it may be convenient for purposes of economy to omit the conduits k and o and the corresponding valves x, as these parts can easily be built in afterward if required. The oven is rendered available for both methods of working by fitting the gas distributing channel h and the described arrangement of regenerators.

There may be more than two regenerators for connection to each flue.

What I claim is:—

1. In a retort oven for producing gas and coke, a pair of coking chambers, an intermediate heating flue, two pairs of regenerators communicating with said flue, and means for jointly utilizing the regenerators of both pairs for preheating the air of combustion, combined with means for separately utilizing the regenerators of each pair for respectively preheating the gas and the air of combustion.

2. In a retort oven for producing gas and coke, a pair of coking chambers, an intermediate heating flue, means adapted to admit the gas of a first supply into said flue, two pairs of regenerators communicating with said flues, and reversible means for admitting the air of combustion to both regenerator-pairs, combined with reversible means adapted to admit gas of a second supply to one regenerator-pair, and with reversible means adapted to admit the air of combustion to the other regenerator-pair.

HEINRICH KOPPERS. [L. S.]

Witnesses:
CHAS. J. WRIGHT,
ALFRED HENKEL.